United States Patent
Petersen et al.

(10) Patent No.: US 8,336,287 B1
(45) Date of Patent: *Dec. 25, 2012

(54) SOLID PROPELLANT ROCKET MOTOR HAVING SELF-EXTINGUISHING PROPELLANT GRAIN AND SYSTEMS THEREFROM

(75) Inventors: Eric L. Petersen, College Station, TX (US); Sudipta Seal, Orlando, FL (US); Matthew Stephens, Elkton, MD (US); David L. Reid, Orlando, FL (US); Rodolphe Carro, Melbourne, FL (US); Thomas Sammet, Orlando, FL (US); Alex Lepage, Oviedo, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 1028 days.

This patent is subject to a terminal disclaimer.

(21) Appl. No.: 12/413,284

(22) Filed: Mar. 27, 2009

Related U.S. Application Data

(60) Provisional application No. 61/040,056, filed on Mar. 27, 2008.

(51) Int. Cl.
- *C06D 5/00* (2006.01)
- *F02K 9/00* (2006.01)
- *C06B 45/00* (2006.01)

(52) U.S. Cl. .................... 60/219; 149/2; 149/3; 60/251; 60/253

(58) Field of Classification Search .......... 60/219, 60/251, 253; 149/1–3, 37, 42, 75, 76, 87, 149/108.2, 109.2, 109.4
See application file for complete search history.

(56) References Cited

U.S. PATENT DOCUMENTS

| | | | | |
|---|---|---|---|---|
| 4,632,714 A * | 12/1986 | Abegg et al. | | 149/2 |
| 5,771,679 A * | 6/1998 | Taylor et al. | | 60/219 |
| 6,086,692 A * | 7/2000 | Hawkins et al. | | 149/19.9 |
| 6,393,830 B1 * | 5/2002 | Hamke et al. | | 60/229 |
| 7,716,912 B2 * | 5/2010 | Cover et al. | | 60/228 |
| 8,114,229 B1 * | 2/2012 | Petersen et al. | | 149/2 |

OTHER PUBLICATIONS

Bimal P. Singh, et al., "Evaluation of Dispersibility of Aqueous Alumina Suspension in Presence of Darvan C", Ceramics International 30 (2004) pp. 939-946.

A. Schrijnemakers, et al., "Mullite Coatings on Ceramic Substrates: Stabilisation of Al2O3-SiO2 Suspensions of Spray Drying of Composite Granules Suitable for Reactive Plasma Spraying", Journal of the European Ceramic Society 29 (2009) pp. 2169-2175.

* cited by examiner

*Primary Examiner* — Ehud Gartenberg
*Assistant Examiner* — Arun Goyal
(74) *Attorney, Agent, or Firm* — Jetter & Associates, P.A.

(57) ABSTRACT

A solid rocket motor includes a combustion chamber bounded by an outer casing, a propellant grain within the combustion chamber, and an igniter within the outer casing for igniting the propellant grain. A nozzle is coupled to the combustion chamber for releasing hot gasses evolved from burning the propellant grain to provide thrust for propelling the solid rocket motor. The propellant grain is a self-extinguishing propellant grain that includes at least one fuel, at least one oxidizing agent, at least one binder, and at least one surfactant that imparts the self-extinguishing property. The propellant grain provides a burning rate as a function of pressure that includes a negative pressure dependence portion, wherein the burning rate in the negative pressure dependence portion decreases with increasing pressure until a cutoff pressure is reached which results in extinguishment of the propellant grain.

20 Claims, 7 Drawing Sheets

SOLID PROPELLANT ROCKET MOTOR HAVING SELF-EXTINGUISHING PROPELLANT GRAIN AND SYSTEMS THEREFROM

CROSS REFERENCE TO RELATED APPLICATIONS

This application claims the benefit of Provisional Application Ser. No. 61/040,056 entitled "EXTINGUISHABLE SOLID ROCKET PROPELLANT ROCKET MOTOR" filed Mar. 27, 2008, which is hereby incorporated by reference in its entirety.

FEDERAL RIGHTS STATEMENT

The U.S. Government has rights to embodiments of the invention based on Missile Defense Agency contract #HQ0006-05-0023.

FIELD

Embodiments of the present invention relate to solid propellant rocket motors and systems therefrom.

BACKGROUND

A solid rocket motor or composite propellant rocket motor is a rocket with a motor that uses solid propellants comprising a fuel and an oxidizer. The solid propellant is normally in the form of a propellant grain placed within the interior of the rocket motor (e.g. in the combustion chamber) and burned to produce hot gases which, in turn, exit through the throat and nozzle of the rocket motor at high velocity to provide thrust which propels the rocket in the opposite direction.

Although liquid rockets are commonly used today due to better efficiency and controllability as compared to solid rockets, solid rockets are still used in certain applications primarily because they are relatively easy to manufacture and generally exhibit excellent performance characteristics. In addition, solid rockets are generally less complex as compared to those employing liquid fuels. However, unlike liquid propellant rockets, solid propellant rockets are unable to control or alter their thrust characteristics after ignition by adjusting the amount of fuel entering the area of combustion.

Known composite propellant rocket motors have generally been shut-off by a process of sudden depressurization, but the Present Inventors are not aware of a disclosed shut-off process functional at operational pressures. Some shut-off processes involve a destructive means of operation, such as requiring physical rupture of the case in some fashion to depressurize the combustion chamber. This practice has several pitfalls, such as severe structural damage to the motor and uncontrolled burn-off of the remaining solid propellant.

In one application for solid rockets, the interception of attacking ballistic missiles above the atmosphere is achieved by launching an interceptor missile against the attacking missile. The interceptor is directed toward the attacking missile (the so-called "target") and preferably hits or explodes in the vicinity of the target, generally causing the target severe damage and perhaps even complete destruction. Typically, the interceptor comprises a one (or several) stage booster and the so-called "kill vehicle".

Generally, the kill vehicle is required to maneuver in space in order to adjust its position with regard to its target, to compensate for cuing errors raised by ground or space detection and tracking systems and onboard navigation errors and in response to tracked target maneuvers. Future missile defense systems will generally employ kinetic-energy kill vehicles. The two primary components of a kinetic-energy kill vehicle include sensors for target identification and tracking, and a divert and attitude control system (DACS) for maneuvering the kill vehicle. One of the promising technologies for the interceptor's DACS propulsion is the use of a solid rocket motor. A solid DACS is preferable over a liquid-based system for reasons described above. To satisfy the extreme requirements of a DACS motor, which can include trajectory adjustment and multiple firings, the solid motor must be able to be extinguished and relit, generally a plurality of times. To date, the extinguishment of burning solid propellants does not occur naturally, so the available technology generally requires a complicated rapid depressurization technique to stop the propellant from burning.

SUMMARY

This Summary is provided to comply with 37 C.F.R. §1.73, presenting a summary of the invention to briefly indicate the nature and substance of the invention. It is submitted with the understanding that it will not be used to interpret or limit the scope or meaning of the claims.

One embodiment of the present invention comprises a solid rocket motor comprising a combustion chamber bounded by an outer casing, a propellant grain within the combustion chamber, an igniter within the outer casing for igniting the propellant grain, and a nozzle coupled to the combustion chamber for releasing hot gasses evolved from burning the propellant grain to provide thrust for propelling the solid rocket motor. The propellant grain comprises at least one fuel, at least one oxidizing agent, at least one binder, and at least one surfactant. The propellant grain is a "self-extinguishing" propellant grain that exhibits a burning rate as a function of pressure that includes a negative pressure dependence portion, wherein the burning rate in the negative pressure dependence portion decreases with increasing pressure until a cut-off pressure is reached which results in extinguishment of the propellant grain.

As used herein, the term "surfactant" refers to a material having both a lipophilic component and a hydrophilic component, and also includes surface active polymers. As known in the art, surfactants are generally classified by the presence of formally charged groups in its head, with non-ionic, cationic, anionic, and cationic surfactants. If a surfactant contains a head with two oppositely charged groups, it is termed zwitterionic. All surfactant types can generally be used with embodiments of the invention.

DETAILED DESCRIPTION

Figure 1:
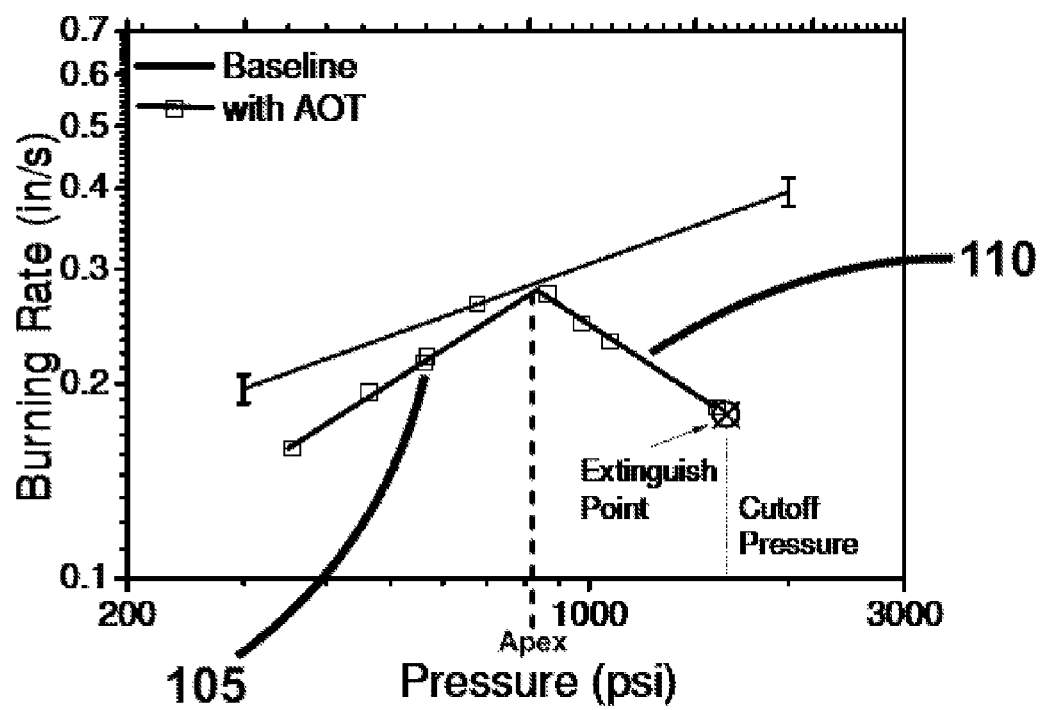
FIG. 1 shows burning rate data for a conventional 80/20 ammonium perchlorate (AP)/hydroxyl-terminated polybutadiene (HTPB) solid propellant as compared to a self-extinguishing "baseline" composite propellant according to an embodiment of the invention comprising an identical AP/HTPB propellant composition with the exception of the addition of an exemplary anionic surfactant comprising sodium dioctyl sulfosuccinate ($C_{20}H_{37}O_7S$)Na (AOT).

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

Embodiments of the present invention describe solid rocket propellant rocket motors and related systems that include solid rocket motors comprising a self-extinguishing solid composite propellant grain. The self-extinguishing propellant grain comprises at least one fuel, at least one oxidizing agent, at least one binder, and at least one surfactant additive. The addition of a suitable surfactant has been found by the Present Inventors to provide the propellant grain the unexpected property of being "self-extinguishing". "Self-extinguishing" as defined herein refers to the burning rate as a function of pressure including a negative pressure dependence portion, wherein the burning rate in the negative pressure dependence portion decreases with increasing pressure until a cutoff pressure is reached which results in extinguishment of the propellant grain. The propellant grain can also comprise at least one catalyst that modifies its burning rate. Significantly, propellant gains according to embodiments of the invention thus can be extinguished without the need for depressurization by reaching a cutoff pressure, and with a tailored burning rate, such as by the addition of a combustion catalyst.

The discovery of an additive that allows the propellant grain to become self-extinguishable is highly unexpected because the natural extinguishment of a solid propellant has been considered difficult if not impossible by those skilled in the art, and also because of its simplicity. Surfactant materials are conventionally utilized to prevent the agglomeration of nanoparticles, but have been unknown prior to discover by the Present Inventors for use in propellant grains.

FIG. 1 shows burning rate data for a conventional "baseline" 80 mass %/20 mass % AP/HTPB propellant grain as compared to a self-extinguishing propellant grain according to an embodiment of the invention comprising an identical AP/HTPB propellant grain with the exception of the addition of an exemplary anionic surfactant comprising sodium dioctyl sulfosuccinate, $(C_{20}H_{37}O_7S)Na$ (AOT) that was found to provide self-extinguishing properties. The AOT comprised 6.66% mass of the self-extinguishing propellant grain according to an embodiment of the invention for which burning rate data is shown in FIG. 1.

The baseline AP/HTPB propellant grain is seen to increase in burning rate as the pressure increases in a generally linear fashion. In contrast, the AP/HTPB propellant grain including AOT according to an embodiment of the invention includes a positive pressure dependence portion 105 having an increasing burning rate with increasing pressure until a maximum burning rate is reached at an apex (maximum) pressure, and a negative pressure dependence portion 110 wherein the burning rate in negative pressure dependence portion decreases with increasing pressure until a cutoff pressure is reached which results in extinguishment of the propellant grain beginning after the apex pressure is reached. Such a burning profile can be referred to as an "apex" burning rate profile. The Present Inventors have observed that the AP/HTPB propellant grains including AOT according to an embodiment of the invention would not burn for pressures above a maximum value (for pressures greater than the last data point near 1300 psi in FIG. 1 shown as the "cutoff pressure").

The Present Inventors have observed that if the pressure first begins at a value below the cutoff pressure at the start of the burn and then increases during the burn to a level at or above this cut-off pressure value, the propellant grain self-extinguishes. This phenomenon has been found to be very repeatable, and it has also been found that the cutoff pressure as well as the slope of the negative pressure dependence is a function of the amount of surfactant and/or catalyst as described below is present in the propellant grain.

The fuel can comprise a variety of fuels, such as elemental Al. The fuel can be in the form of a nanopowder, such as an Al nanopowder. The average size of the nanopowder can be in the 100 s of nms, 10 s of nms, or several nms (e.g. 5 to 10 nm).

The oxidizing agent can comprise a variety of oxidizing agents. In certain embodiments, the oxidizing agent comprises AP or ammonium nitrate (AN).

The binder can comprise a variety of binders. Many of the known binders are polymeric materials. In one embodiment the binder comprises HTPB.

In some embodiments of the invention, the solid composite propellant can also comprise at least one catalyst that modifies the burning rate of the propellant grain. The catalyst can be a nanoparticle catalyst. In one embodiment of the invention the nanoparticle catalyst comprises nanocrystalline titania ($TiO_2$) doped with at least one metal, wherein the metal is about 1 to 10 wt. % of nanoparticle catalyst. The titania is generally primarily at least 60%, 70% or 80% anatase.

In one embodiment, both the fuel and catalyst for the propellant grain are provided by fuel/catalyst core-shell composite nanoparticles. For example, in one embodiment, the fuel/catalyst core-shell composite nanoparticles can comprise aluminum/titania core-shell composite nanoparticles.

The surfactant generally comprises 1 to 20 wt % of the propellant grain. As described above, the surfactant can generally be a non-ionic, ionic anionic, cationic, or zwitterionic surfactant, or a mixture of surfactants. In one embodiment of the invention, the surfactant comprises an anionic surfactant, such as sodium dioctyl sulfosuccinate, $(C_{20}H_{37}O_7S)Na$ (AOT).

Figure 2:
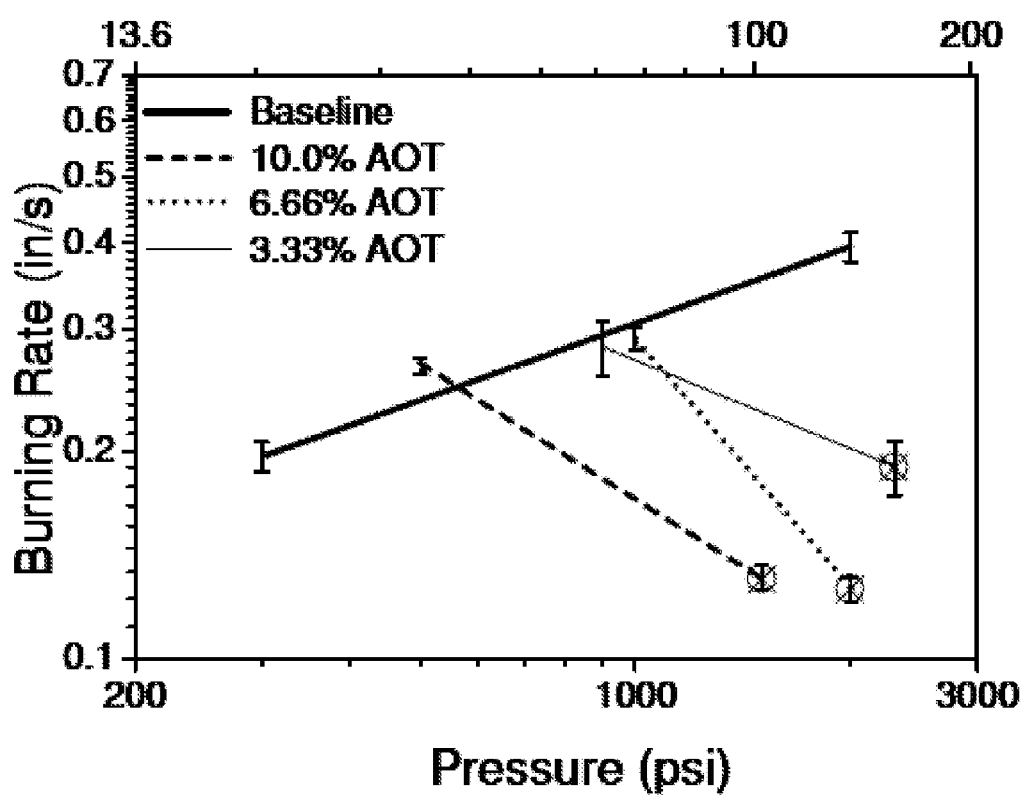
FIG. 2 shows comparative burning rate data for a conventional 80/20 AP/HTPB solid propellant as compared to an otherwise identical AP/HTPB propellant composition with added AOT in various levels according to an embodiment of the invention, in a pressure range for the negative pressure dependence portion (see reference 110 in FIG. 1) for the AP/HTPB/AOT composite propellant.

FIG. 2 shows comparative burning rate data for a conventional 80/20 AP/HTPB propellant grain as compared to an otherwise identical AP/HTPB propellant grain with added AOT in various levels according to embodiments of the invention, in a pressure range for the negative pressure dependence portion (reference 110 in FIG. 1) for the AP/HTPB/AOT composite propellant. The AOT levels shown are for 3.33, 6.66 and 10.0 mass %. The AP/HTPB/AOT propellant grain is seen to evidence the ability to change the cutoff pressure and the pressure dependency (e.g. slope) by changing the level of surfactant.

Figure 3:
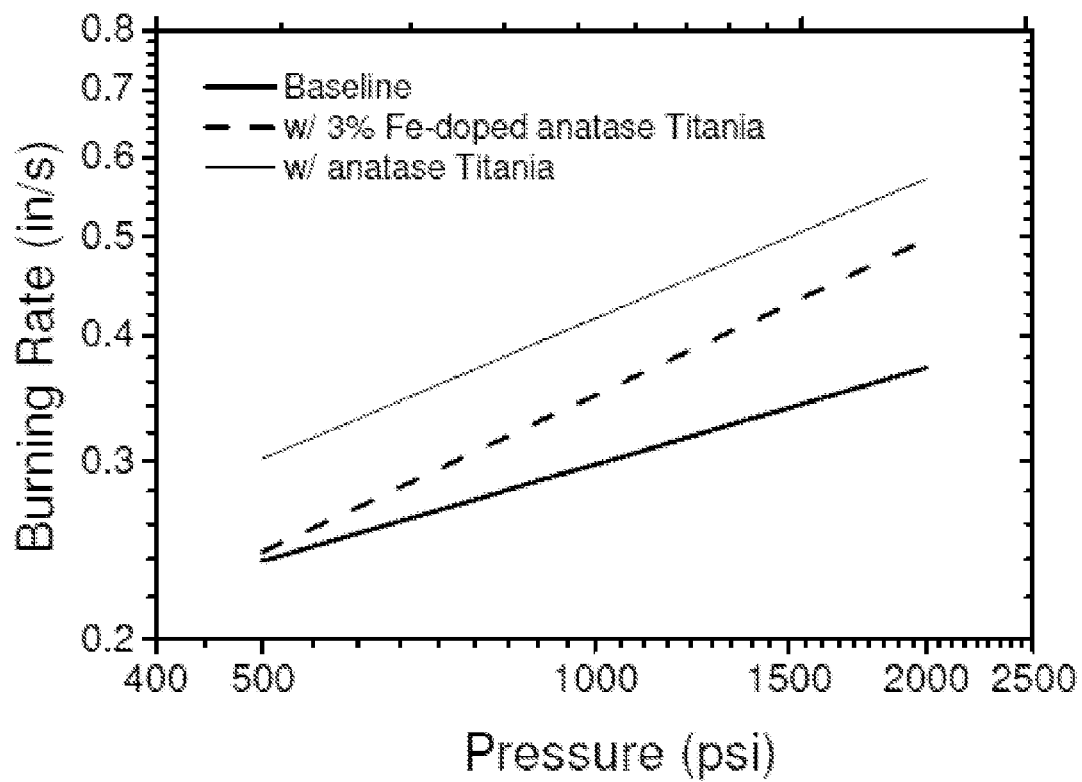
FIG. 3 shows burning rate data for two exemplary solid propellants according to embodiments of the invention with different nano-sized titania (catalyst) additives in comparison to a conventional 80/20 AP/HTPB baseline propellant without catalyst additives.

As described above, the propellant grain can also comprise at least one catalyst that modifies the burning rate of the propellant grain. FIG. 3 shows burning rate data for two exemplary propellant grains according to embodiments of the invention with different nano-sized titania (catalyst) additives in comparison to a conventional 80/20 AP/HTPB baseline propellant grain without any additives. The additives were each 0.5% of total propellant mass. The additives are both 0.5% of total propellant mass. The dashed curve is for a solid composite propellant comprising a catalyst comprising anatase titania doped with 3% Fe according to an embodiment of the invention, the dark solid line for a solid composite propellant comprising a catalyst comprising anatase titania according to an embodiment of the invention, and the light solid line burning rate data from a conventional 80/20 AP/HTPB baseline propellant composition.

Figure 4A:
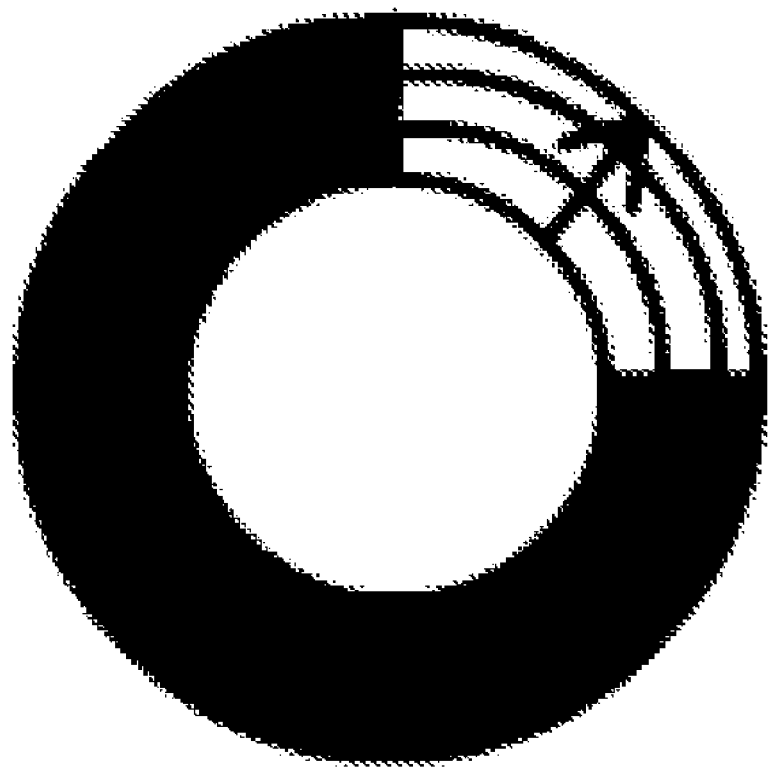
FIGS. 4A and B show depictions of a progressive burning grain and its burning characteristics, respectively, according to an embodiment of the invention.
Figure 4B:
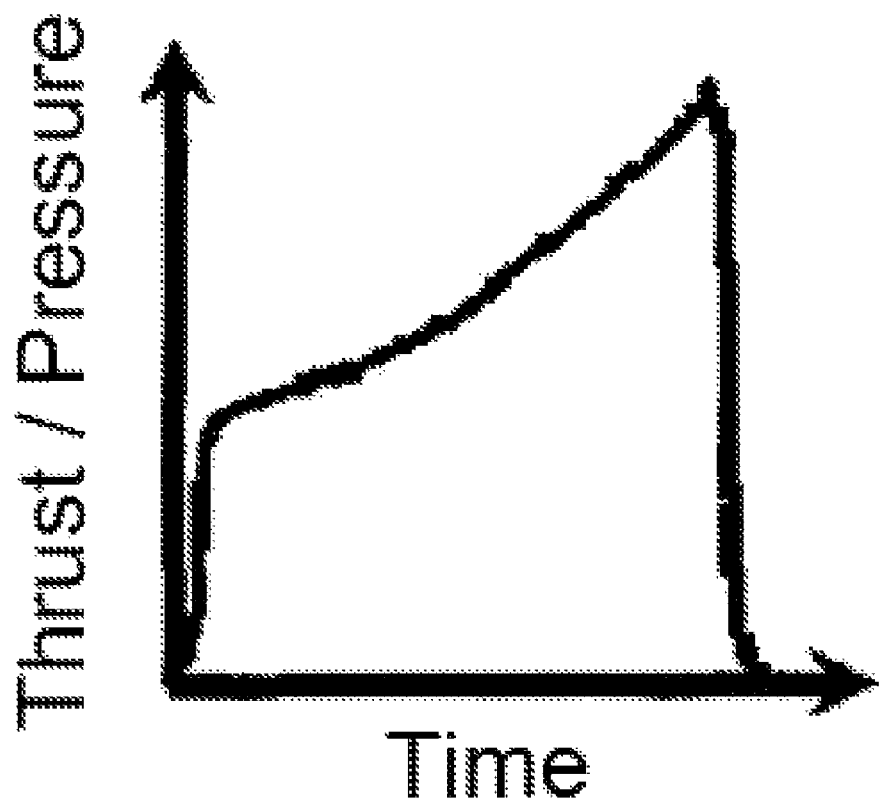

In one embodiment, the propellant grain can comprise a progressive burning grain that increases its burning rate as it burns. For example, the progressive burning grain can comprise a tubular grain geometry which as a burn time increases, the burning surface area also increases. In one application, the progressive burning propellant grain burns until the combustion chamber builds up enough pressure from normal operation to reach its upper burning limit (i.e. the cutoff pressure), which extinguishes the propellant grain. FIGS. 4A and B show depictions of a tubular progressive burning grain and its burning characteristics, respectively, according to an embodiment of the invention.

Self-extinguishing propellant gains according to embodiments of the invention can be generally prepared in conventional fashion by adding the following sequentially to a mixing vessel:
1. Binder components (generally added as liquids);
2. Surfactant;
3. Plasticizers;
4. Optional burn rate catalyst
5. Solid fuel(s) (incremental addition, e.g. Al);
6. Solid oxidizers (incremental addition); and
7. Cure catalyst(s) and curative(s) (e.g. isocyanate(s)).

The final mixing can be performed under vacuum, i.e., upon the addition of the solid fuel, which is typically a metal powder as described above having an average size in the nm range, such as 10 s of nms or hundreds of nm.

In one embodiment of the invention, a solid rocket motor can be static controlled using a progressive burning propellant grain according to an embodiment of the invention. This progressive burning behavior causes the pressure and thrust of the motor to increase over time. If an apex burning propellant is used in such geometry, such as in the tubular geometry shown in FIG. 4A, the motor automatically shuts-off at such time when the internal pressure reaches the upper burning limit (cutoff pressure, such as shown in FIG. 1). Analysis and design alterations allow precise motor shut-off events without the violent consequences as seen in current practices. The self-extinguishable rocket motor can also be used to stop the burning in a motor that is experiencing large pressure fluctuations due to combustion instability. Combustion instability continues to be a problem in development and field rocket motors. The extinguishment of the propellant grain will avoid a rapid buildup of pressure that might cause catastrophic failure of the motor and the entire rocket and payload. The rocket motor could be re-lit to continue the mission, or at least the rocket and payload can be salvaged. These technique generally can be used with all motor applications and can generally also be easily created by modifying current (existing) motor systems (e.g. retrofit).

One application for self-extinguishing propellant grains according to embodiments of the invention is for divert and attitude control system (DACS) solid rocket motors. One attribute of solid motors is that they are less volatile as compared to liquid-based motors, which is a necessary requirement for shipboard applications. One of the impediments for making a solid DACS motor viable is the requirement that the propellant grain must be able to be extinguished and then relit, often multiple times. Because conventional propellants grains are inherently incapable of this requirement, rapid depressurization is needed, such exposing the propellant grain to an expansion wave through rapid depressurization of the combustion chamber. Extinguishment through this method using conventional propellant grains requires a fast-acting expansion valve or similar device. Rapid depressurization also generally requires externally calibrated hardware to vent the motor chamber.

The extinguishment methods disclosed herein is conceptually different from rapid depressurization in that the ability to extinguish is tied directly to the propellant grain composition and optionally its shape as well. In contrast to conventional propellant grains, self-extinguishing propellant grains according to embodiments of the invention described above provide the propellant the unique characteristic that the propellant can self-extinguish for a particular range of pressures. In addition, as described above, the propellant formula also exhibits a burning rate with a negative pressure dependence portion, with the pressure at which the propellant extinguishes (cutoff pressure) being a function of the amount of surfactant additive present, with no need for a fast-acting expansion valve or similar device.

Propellant grains according to embodiments of the invention are thus self-extinguishing, which allows rocket-based systems to be less complicated. For example, for use in DACS applications, such as for kill-vehicles. Through surfactant additive and optional burn rate catalysts, self-extinguishing propellant grains according to embodiments of the invention can have its burning rate, thrust profile, and weight tailored to meet a specific missile application.

Embodiments of the invention will not only produce a solid rocket motor capable of non-destructive shut-off but can also serve as a safety mechanism ensuring safe pressures inside the motor to avoid combustion instability induced catastrophic failures. These new features for solid rocket motors will not only increase their dependability applications but will aid in their acceptance as man-rated propulsion units. As described below, The solid rocket motor can operate on two different principles, static control or dynamic control.

Figure 5A:
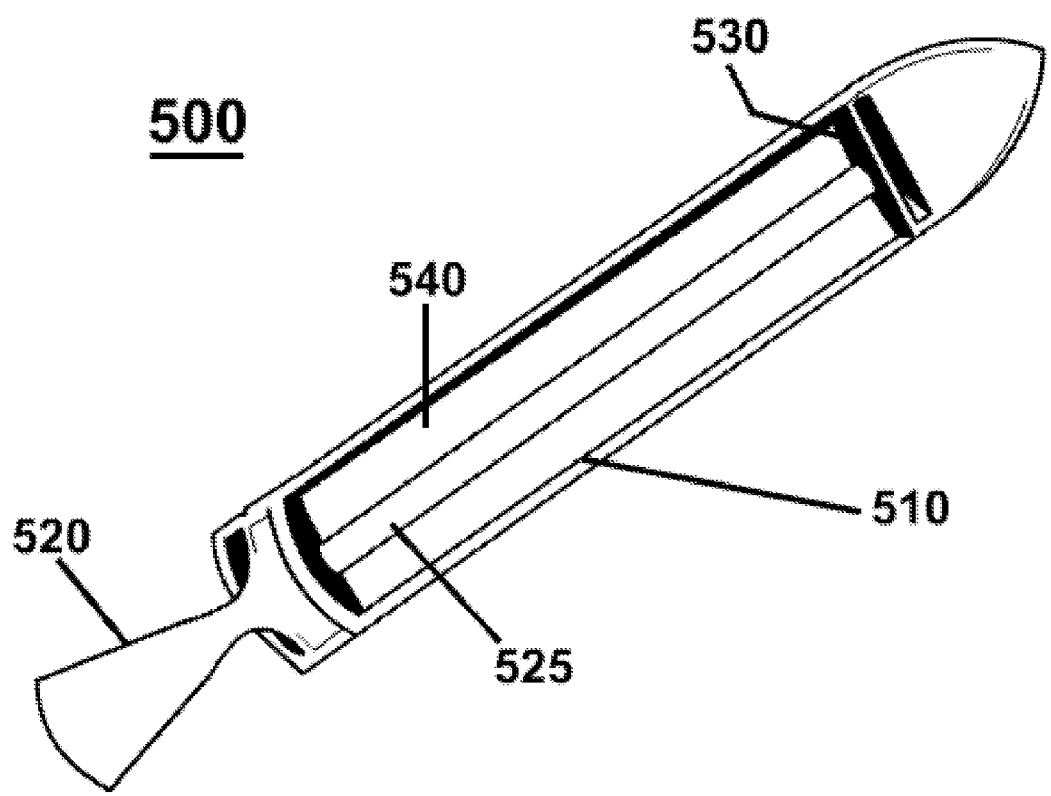
FIGS. 5A and B show depictions of a statically and dynamically controlled solid rocket motor respectively, according to embodiments of the invention.

FIG. 5A shows a partial cutaway depiction of a statically controlled solid rocket motor 500, according to an embodiment of the invention. The solid rocket motor comprises a case 510, nozzle 520, an igniter shown as an ignition charge 530, and propellant grain 525 that is within a combustion chamber 540.

When solid rocket motor 500 shuts down, the propellant grain 525 simply ceases to burn leaving the solid rocket motor 500 generally unscathed. No extra hardware is needed in this static control arrangement. Here, the propellant grain 525 burns until the combustion chamber 540 builds up enough pressure from normal operation to reach the upper burning limit of the propellant grain 525, which extinguishes the propellant grain 525. In one embodiment of the static control embodiment, this can be achieved using a progressive burning grain. As defined herein, a progressive burning grain when burned causes pressure in the combustion chamber and thus the pressure and thrust of the motor to increase over time. As described above, in the exemplary embodiment shown in FIG. 4A, the progressive grain comprises a tubular grain geometry which in time, increases in burning surface area. This burning behavior causes the pressure and thrust of the solid rocket motor 500 to increase over time. If an apex burning propellant according to an embodiment of the invention is used in such a propellant grain geometry, the solid rocket motor 500 automatically shuts-off at such time when the internal pressure (in the combustion chamber 540) reaches its upper burning limit (i.e. the cutoff pressure, such as shown in FIG. 1). Analysis and design modifications can allow precise motor shut-off events without the violent and destructive consequences as seen in conventional practices. Embodiments of the invention can generally be used with all solid motor applications and can also be easily created by modifying current (existing) motor systems (e.g. by retrofitting).

Figure 5B:
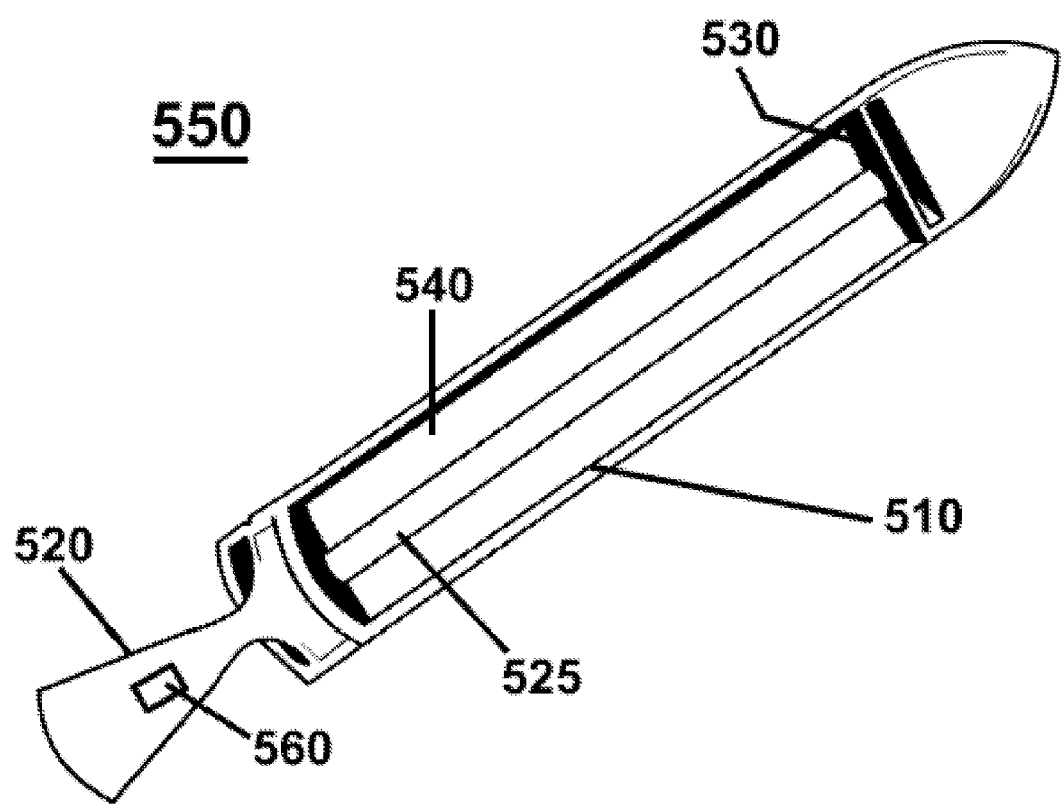

FIG. 5B shows a partial cutaway depiction of a dynamically controlled solid rocket motor 550, according to an embodiment of the invention. Solid rocket motor 550 includes the same components shown in FIG. 5A for solid rocket motor 500, but adds pressure regulating hardware 560 which can comprise a nozzle valve. This dynamic control version can generally be used with any propellant grain geometry since it is based on the use of conventional pressure regulating hardware, such as a nozzle valve or an adjustable pintle. The use of nozzle valves and adjustable pintles or other suitable pressure regulating hardware to vary the throat area has been widely used within the industry to control combustion chamber pressures. Using such mechanical devices in conjunction with a self-grain extinguishing propellant according to an embodiment of the invention can allow motor shut-off at any instance during use of solid rocket motor 550. This system can easily be fitted into small-scale applications where ducted motors are most commonly seen. However, such a system can be applied to large-scale booster motors. In both of these cases the propellant grain 525 is left extinguished, but still intact, within the solid rocket motor 550, and thus the motor is generally re-ignitable. This can be realized by the adaptation of a reusable igniter charge 530, or the inclusion of multiple expendable igniters inside the casing 510. Accordingly, solid rocket motors according to embodiments of the invention can reach a new level of safety and controllability of solid motors that has yet to be achieved with solid rocket motors having conventional propellant grains.

Solid rocket motors 500 and 550 can be embodied as a DACS, such as for a kinetic-energy kill vehicle comprising system. As known in the art, the two primary components of a kinetic-energy kill vehicle include sensors for target identification and tracking, and a DACS for maneuvering. As known in the art, kill vehicles include sensors for target identification and tracking, and a DACS comprising a solid rocket motor, such as solid rocket motor 500 or 550 for propulsion for maneuvering the kill vehicle.

Solid rocket motors according to embodiments of the invention have a wide variety of other applications due to significant advantages over available solid rocket motors. Embodiments of the invention will not only produce a solid rocket motor capable of shut-off as described above, but also will also serve as a safety mechanism ensuring safe pressures inside the motor. This new developmental step for the solid rocket motor will not only increase their dependability applications but will aid in their acceptance as man-rated propulsion units. The foreseen main use of such a motor would be as boosters for space-access vehicles for both cargo (satellites) and manned craft. Other possible of the many applications include those in the military industry.

For example, technology according to embodiments of the invention can be applied to the space industry for either cargo lifting purposes or manned space-flight. Some military applications exist as well such as missile directional attitude control systems or main propulsion units, and for improved missile design. Commercial rocket applications for satellite placement are also possible. In addition, solid rocket motors according to embodiments of the invention are well adapted for small-scale operations, attitude controls, and gas generators.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In particular, variations on binder oxidizer and surfactant will be apparent to those skilled in the art. While a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

We claim:

1. A solid rocket motor, comprising:
 a combustion chamber bounded by an outer casing;
 a propellant grain within said combustion chamber;
 an igniter within said outer casing for igniting said propellant grain, and
 a nozzle coupled to said combustion chamber for releasing hot gasses evolved from burning said propellant grain to provide thrust for propelling said solid rocket motor,
 wherein said propellant grain comprises at least one fuel, at least one oxidizing agent, at least one binder, and at least one surfactant in an effective amount of at least 3.33 wt % of said propellant grain, said propellant grain exhibiting a burning rate as a function of pressure that includes a negative pressure dependence portion, said burning rate in said negative pressure dependence portion decreasing with increasing pressure until a cutoff pressure is reached which results in extinguishment of said propellant grain.

2. The solid rocket motor of claim 1, wherein said burning rate includes a positive pressure dependence portion increasing said burning rate with an increase in pressure until a maximum burning rate is reached at an apex pressure, said negative pressure dependence portion being at a pressure higher than said apex pressure.

3. The solid rocket motor of claim 1, wherein said surfactant comprises 6.66 wt % to 20 wt % of said propellant grain.

4. The solid rocket motor of claim 3, wherein said surfactant comprises an anionic surfactant.

5. The solid rocket motor of claim 4, wherein said anionic surfactant comprises sodium dioctyl sulfosuccinate, $(C_{20}H_{37}O_7S)Na$ (AOT).

6. The solid rocket motor of claim 1, wherein said oxidizing agent comprises ammonium perchlorate (AP) or ammonium nitrate (AN).

7. The solid rocket motor of claim 1, wherein said binder comprises hydroxyl-terminated polybutadiene (HTPB).

8. The solid rocket motor of claim 1, further comprising at least one catalyst that modifies said burning rate of said propellant grain.

9. The solid rocket motor of claim 8, wherein said catalyst comprises a nanoparticle catalyst.

10. The solid rocket motor of claim 1, further comprising at least one catalyst that modifies said burning rate of said propellant grain, wherein said fuel and said catalyst are provided by fuel/catalyst core-shell composite nanoparticles.

11. The solid rocket motor of claim 10, wherein said fuel/catalyst core-shell composite nanoparticles comprise aluminum/titania core-shell composite nanoparticles.

12. The solid rocket motor of claim 1, wherein said fuel comprises a nanopowder.

13. The solid rocket motor of claim 1, wherein said propellant grain comprises a progressive burning grain that increases said burning rate as it burns until said combustion chamber builds up enough pressure from operation to reach said cutoff pressure wherein said propellant grain completely shuts-off during operation of said solid rocket motor.

14. The solid rocket motor of claim 13, wherein said progressive burning grain comprises a tubular grain geometry which increases in burning surface area as a burn time increases.

15. The solid rocket motor of claim 1, wherein said solid rocket motor further comprises pressure regulating hardware for regulating a pressure in said combustion chamber, wherein when said pressure regulating hardware raises a pressure in said combustion chamber high enough to reach said cutoff pressure so that said propellant grain completely shuts-off during operation of said solid rocket motor.

16. A method of operating a solid rocket motor, comprising:
providing said solid rocket motor having a combustion chamber bounded by an outer casing and a propellant grain within said combustion chamber, said propellant grain comprising at least one fuel, at least one oxidizing agent, at least one binder, and at least one surfactant in an effective amount of at least 3.33 wt % of said propellant grain, said propellant grain exhibiting a burning rate as a function of pressure that includes a negative pressure dependence portion, said burning rate in said negative pressure dependence portion decreasing with increasing pressure until a cutoff pressure is reached which results in extinguishment of said propellant grain;
burning said propellant grain at an operating pressure that is below said cutoff pressure to propel said solid rocket motor;
increasing a pressure during said burning to a pressure at or above said cutoff pressure, and
extinguishing said burning when said pressure reaches at least said cutoff pressure, wherein said solid rocket motor remains in-tact following said extinguishing.

17. The method of claim 16, further comprising re-lighting said propellant grain following said extinguishing after said pressure returns to a level below said cutoff pressure.

18. The method of claim 16, wherein said solid rocket motor is used on a mission including a payload, said extinguishing avoiding a rapid buildup of said pressure by limiting said pressure to approximately said cutoff pressure to preserve said rocket and said payload during an entire duration of said mission.

19. The method of claim 16, wherein said propellant grain provides a progressive pressure/thrust profile wherein said pressure increases with time during said burning, further comprising statically controlling said pressure during said burning.

20. The method of claim 16, further comprising dynamically controlling said pressure during said burning using a throttle on a nozzle exhaust of said solid rocket motor.

* * * * *